United States Patent [19]

Stempin et al.

[11] Patent Number: 5,422,319

[45] Date of Patent: Jun. 6, 1995

[54] FIBER REINFORCED CERAMIC MATRIX COMPOSITES EXHIBITING IMPROVED HIGH-TEMPERATURE STRENGTH

[75] Inventors: John L. Stempin, Beaver Dams; Dale R. Wexell, Corning, both of N.Y.

[73] Assignee: Corning Incorporated, Corning, N.Y.

[21] Appl. No.: 242,230

[22] Filed: Sep. 9, 1988

[51] Int. Cl.⁶ .............................................. C04B 35/84
[52] U.S. Cl. ............................................. 501/9; 501/5; 501/6; 501/8; 501/69; 501/70; 501/73; 501/95; 428/367; 428/378; 428/379
[58] Field of Search .................... 501/95, 8, 9, 5, 6, 501/69, 70, 73, 152; 428/367, 378, 389

[56] References Cited

U.S. PATENT DOCUMENTS

| | | | |
|---|---|---|---|
| 3,869,335 | 3/1975 | Siefert | 161/143 |
| 4,376,803 | 3/1983 | Katzman | 428/408 |
| 4,376,804 | 3/1983 | Katzman | 428/408 |
| 4,397,901 | 8/1983 | Warren | 428/101 |
| 4,405,685 | 9/1983 | Honjo et al. | 428/368 |
| 4,481,257 | 11/1984 | Suplinskas et al. | 428/366 |
| 4,485,179 | 11/1984 | Brennan et al. | 501/32 |
| 4,589,900 | 5/1986 | Brennan et al. | 65/33 |
| 4,605,588 | 8/1986 | Simpson et al. | 428/288 |
| 4,615,987 | 10/1986 | Chyung et al. | 501/8 |
| 4,626,515 | 12/1986 | Chyung et al. | 501/32 |
| 4,642,271 | 2/1987 | Rice | 428/698 |
| 4,732,877 | 3/1988 | Olson et al. | 501/95 |
| 4,755,498 | 7/1988 | Chyung et al. | 501/8 |
| 4,769,346 | 9/1988 | Gadkaree et al. | 501/95 X |
| 4,772,524 | 9/1988 | Coblenz | 428/389 X |

FOREIGN PATENT DOCUMENTS 9156972  9/1984  Japan ..................................... 501/95

OTHER PUBLICATIONS

R. L. Stewart et al., "Fracture of SiC Fiber/Glass-Ceramic Composites as a Function of Temperature," in *Fracture Mechanics of Ceramics*, R. C. Bradt et. al. Ed., vol. 7, pp. 33-51, Plenum, New York, 1986.

*Primary Examiner*—William R. Dixon, Jr.
*Assistant Examiner*—Karl Group
*Attorney, Agent, or Firm*—K. van der Sterre

[57] ABSTRACT

Novel oxide coatings which can be conveniently applied to reinforcing fibers such as silicon carbide fibers, and which when introduced as a fiber coating into fiber reinforced ceramic matrix composites provide composites exhibiting improved resistance to embrittlement at high temperatures, are described. Oxides effective to provide the improved composites in accordance with the invention include $CeO_2$ and $ZrO_2$.

13 Claims, 1 Drawing Sheet

FIBER REINFORCED CERAMIC MATRIX COMPOSITES EXHIBITING IMPROVED HIGH-TEMPERATURE STRENGTH

BACKGROUND OF THE INVENTION

The present invention relates generally to fiber-reinforced composites wherein the matrix consists of a ceramic material, and more particularly to ceramic matrix composites wherein the reinforcing fibers are silicon carbide fibers and the matrix is an alkaline earth aluminosilicate glass or glass-ceramic.

Fiber-reinforced ceramic matrix composites comprising glass and/or glass-ceramic matrices are well known. U.S. Pat. No. 4,626,515 for example, discloses fiber-reinforced composites wherein the reinforcing fibers are composed of silicon carbide and the reinforced matrix is an essentially alkali-free, alkaline earth aluminosilicate glass. U.S. Pat. No. 4,615,987 discloses silicon carbide fiber reinforced glass-ceramic composites wherein the matrix consists of an alkaline earth aluminosilicate glass-ceramic composition. Similar silicon-carbide-reinforced composites wherein the matrix consists of a barium-modified magnesium aluminosilicate glass-ceramic are reported in U.S. Pat. No. 4,589,900, while U.S. Pat. No. 4,755,489 discloses reinforced glass-ceramics containing anorthite and mullite or alumina.

Prospective uses for fiber-reinforced ceramic matrix composites such as described in these and other prior patents and literature include use as a structural element in high temperature environments such as heat engines. Thus the materials to be employed must not only exhibit good strength and toughness at ambient temperatures, but must also retain those desirable physical properties at the elevated temperatures encountered in the operating environment. Temperatures in the range of 700°–1000° C. and highly oxidizing conditions (due to the high-temperature activity of oxygen) are considered representative of the operating conditions to be encountered.

An important problem which has been identified in silicon carbide reinforced ceramic matrix composites in this temperature regime is that of high temperature embrittlement. Hence, instead of exhibiting high toughness and strength after exposure to temperatures in the operation ranges desired, these materials become brittle and subject to sudden catastrophic breakage, rather than more gradual failure as typical of the original material. While the exact mechanism of embrittlement has not been fully explained, oxidative deterioration of the fiber-matrix interface is the probable cause. See, for example, R. L. Stewart et al., "Fracture of SiC Fiber/Glass-Ceramic Composites as a Function of Temperature", in *Fracture Mechanics of Ceramics*, R. C. Bradt et al. Ed., Volume 7, pages 33–51, Plenum (New York) 1986.

It is known to provide coatings on fiber materials to be incorporated in composite materials in order to modify the behavior of the materials or the fibers therein. U.S. Pat. No. 4,276,804, for example, describes the application to carbon fibers of metal oxide films for the purpose of improving fiber adherence to a metal matrix.

U.S. Pat. No. 4,397,901 describes a composite article and method for making it wherein a woven or nonwoven fiber substrate, typically composed of carbon fibers, is provided with successive coatings of pyrolytic carbon, diffused silicon, and silicon carbide to provide a composite article resistant to corrosive conditions. U.S. Pat. No. 4,405,685 describes a similar coating system for carbon fibers wherein an inner coating consisting of a mixture of carbon and a selected metal carbide, in combination with an outer coating consisting solely of the metal carbide, are described. This dual coating system is intended to provide enhanced fiber protection for fibers to be embedded in ceramic or particularly metal matrix materials.

U.S. Pat. No. 4,481,257 discloses silicon carbide monofilaments coated with boron or boron carbide. These filaments exhibit improved strength and bonding when used with metal or epoxy matrix materials. U.S. Pat. No. 4,485,179 describes the use, in a ceramic matrix composite comprising silicon carbide fibers, of an agent added to the matrix to reduce interaction with the silicon carbide fibers. Tantalum or niobium compounds are useful for this purpose.

U.S. Pat. No. 4,605,588 discloses a process for providing a boron nitride surface coating on ceramic fibers such as aluminoborosilicate fibers, reportedly effective to reduce reaction bonding of the fiber to glass or ceramic matrices, while U.S. Pat. No. 4,642,271 teaches BN coatings on SiC or alumina fibers. U.S. Pat. Nos. 4,376,803 and 4,376,804, supra, describe composite coatings consisting of amorphous carbon and an overlayer of a metal oxide such as $SiO_2$ to be applied to carbon fibers in order to improve fiber adhesion to molten metal matrix materials such as magnesium and magnesium alloys. U.S. Pat. No. 3,869,335 describes metal coated fibers and metal-glass coated fibers which can be incorporated into glass matrix materials to provide products which exhibit higher ductility than conventional products.

While the foregoing patents and literature indicate a general interest in the development of coatings for fibers to be employed for the reinforcement of composite glass, metal and ceramic materials, the problem of embrittlement of ceramic matrix composites comprising silicon carbide reinforcing fibers remains.

It is a principal object of the present invention to provide a fiber-reinforced ceramic matrix composite comprising silicon carbide fibers which exhibits improved resistance to embrittlement under adverse high temperature conditions.

It is a further object of the invention to provide a method for making silicon carbide-reinforced ceramic matrix composites which provides products of improved strength and/or toughness at high temperatures.

Other objects and advantages of the invention will become apparent from the following description thereof.

SUMMARY OF THE INVENTION

The present invention is founded upon the discovery of novel oxide coatings which can conveniently be applied to reinforcing fibers such as silicon carbide fibers, and which when introduced as a fiber coating into fiber reinforced ceramic matrix composites provide composites exhibiting improved high temperature strength or strength retention. Oxides effective in providing the improved composites in accordance with the invention include $CeO_2$ and $ZrO_2$.

In an important aspect, then, the invention includes a fiber-reinforced ceramic matrix composite comprising reinforcing silicon carbide fibers disposed in a substantially non-porous ceramic matrix, and wherein the silicon carbide fibers are provided with an oxide surface coating. The oxide surface coating consists of at least one oxide selected from the group of $ZrO_2$ and $CeO_2$. Preferably, the ceramic matrix is an alkaline earth aluminosilicate matrix, with glass-ceramic matrix materials of this composition being particularly preferred.

Fiber-reinforced ceramic matrix composites provided in accordance with the invention show improved resistance to embrittlement and/or strength deterioration upon exposure to high temperatures. Thus, these products will typically exhibit little or no strength deterioration when heated from ambient to temperatures in the critical range of 700°–1000° C., or else they will exhibit moderate deterioration or embrittlement but still retain a higher proportion of their initial strength than conventional composites not comprising the oxide-coated fibers.

In a second aspect, the invention includes an improved method for making a fiber-reinforced ceramic matrix composite article. In the general conventional method, such composites are made by embedding inorganic reinforcing fibers in a ceramic matrix material, and thereafter consolidating the fibers and ceramic matrix material with heat and pressure to provide a substantially non-porous ceramic material having the fibers embedded therein. In the improved method, prior to the step of embedding the fibers in the matrix material, the fibers are provided with an oxide coating consisting essentially of at least one oxide selected from the group consisting of $ZrO_2$ and $CeO_2$.

The reasons for the unexpected effectiveness of these coatings to reduce high-temperature embrittlement in ceramic matrix composites are not fully understood. Presumably, however, variables such as adherence to the fibers, chemical compatibility with the fibers and matrix, stability in the high-temperature oxidizing environment and other factors combine in such a way as to effectively protect or modify the fibers or the fiber-matrix interface in the treated materials.

The high-temperature characteristics of the composites of the invention make them particularly suitable for use in applications involving exposure to high temperatures and wherein it is critical to retain a known or predictable level of strength and/or toughness in the composite material in the course of prolonged exposure to such environment.

DESCRIPTION OF THE DRAWING

The invention may be further understood by reference to the drawing wherein.

DETAILED DESCRIPTION

Figure 1:
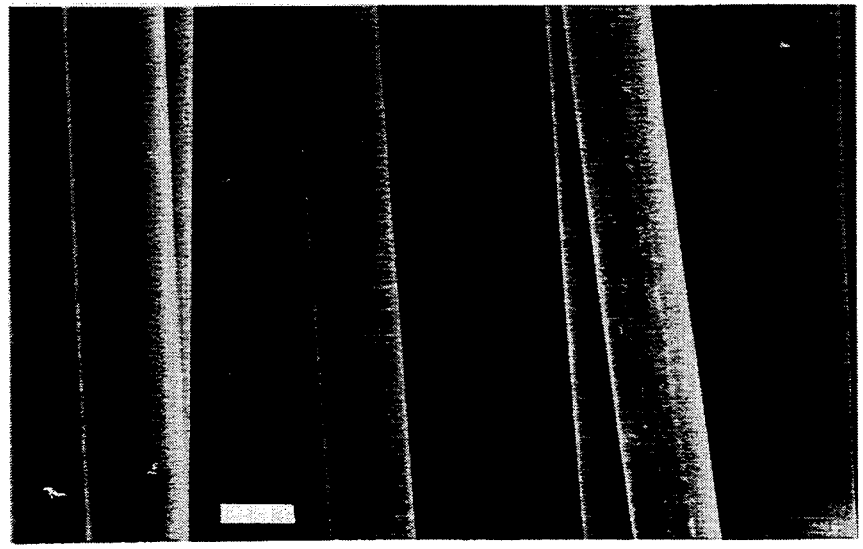
FIG. 1 is an electron photomicrograph of a fiber provided with a $ZrO_2$ coating for use in accordance with the invention.

As previously noted, a principal object of the present invention is to mitigate the effect of embrittlement which is typically observed during or following heating of silicon carbide-reinforced composites above 700° C. in air. This embrittlement is generally manifested by a decrease in fracture toughness and, typically, a change in the fracture habit of the material from one characterized by fiber pullout from the matrix to one wherein woody or brittle fracture occurs. Woody fracture surfaces display some crack propagation parallel to the stress axis, indicating localized shear failure but without significant fibrous pullout. Brittle fracture surfaces display merely planar fracture surfaces as the composite exhibits no plastic deformation.

It has been surmised that embrittlement arises from an oxidation of the surfaces of the fibers, which typically comprise carbon-rich interfacial layers thought to play a role in toughness enhancement in these systems. Microcracks in the composite material at high temperatures could allow oxygen to penetrate to the fiber surfaces, destroying or damaging the carbon-rich layer.

The invention is not conceived as being limited to any particular type of silicon carbide fibers. Thus useful fibers may comprise any of the known types of silicon carbide fibers, including silicon carbide fibers produced by the oxidation of polymers. These typically include significant amounts of oxygen in their composition, and on occasion are alternatively designated silicon oxycarbide fibers in the art. Alternatively, fibers which consist essentially of vapor deposited silicon carbide, and which are therefore substantially free of oxygen, may be used. All of these fiber types will hereinafter simply be referred to as silicon carbide fibers.

An example of a suitable silicon carbide fiber material which is commercially available is Nicalon ® silicon carbide fiber. This material can be purchased as fiber tow or woven fiber mat from the Nippon Carbon Company of Japan.

As in the case of the fibers, the invention is not limited in application to any particular alkaline earth aluminosilicate matrix material. Rather any of the known matrix materials of this type, including alkaline earth aluminosilicate glasses and alkaline earth aluminosilicate glass-ceramics, may be employed.

Preferred glass-ceramic matrix materials are selected and crystallized from alkaline earth aluminosilicate glasses which may be thermally crystallized to products wherein the predominant crystal phase is selected from the group of triclinic anorthite ($CaO,SrO·Al_2O_3·2SiO_2$) and its pseudo-binaries with mullite ($3Al_2O_3·SiO_2$), cordierite ($2MgO·2Al_2O_3·5SiO_2$), barium osumilite ($BaO·2MgO·3Al_2O_3·9SiO_2$), albite solid solution ($Na_2O·Al_2O_3·6SiO_2$), $Al_2O_3$, $SiO_2$, $CaO·SiO_2$, and gehlenite ($2CaO·Al_2O_3·SiO_2$).

Alternatively, the selected glass may be thermally crystallizable to yield a predominant crystal phase consisting essentially of triclinic anorthite and at least one of $\alpha$-alumina and mullite, the compositions containing from 5–50 mole percent alumina in excess of stoichiometric anorthite. By predominant crystal phase is meant a crystal phase or phase group predominating in the glass-ceramic matrix phase of the fiber-reinforced composite article, the crystal phase constituting more than 50% by volume of the glass-ceramic matrix.

Glasses crystallizable to the former type of glass-ceramics are known, and have been utilized in the manufacture of whisker-containing ceramic matrix composites as reported, for example, in U.S. Pat. No. 4,615,987. Such glass typically have a composition within the following ranges, as defined in weight percent on the oxide basis:

| CaO | 0–25 | MgO | 0–15 |
|---|---|---|---|
| SrO | 0–30 | $Na_2O$ | 0–4 |
| CaO+SrO | 10–30 | $K_2O$ | 0–6 |
| $Al_2O_3$ | 25–38 | $TiO_2$ | 0–12 |
| $SiO_2$ | 35–60 | $ZrO_2$ | 0–15 |
| BaO | 0–25 | $As_2O_3$ | 0–3 |
| $BaO+MgO+Na_2O+K_2O+TiO_2+$ | | | 0–30 |

-continued $ZrO_2 + As_2O_3$

Glasses containing excess alumina and being thermally crystallizable to a predominant crystal phase consisting of anorthite plus at least one of mullite and alumina are also known, being described in U.S. Pat. No. 4,755,489. Such glasses typically have a composition within the range, in weight percent, of about 16–20% CaO, 38.5–46% $Al_2O_3$, 35–42% $SiO_2$, 0.25–1.5% $As_2O_3$, and up to 10% total of at least one nucleating agent selected in the indicated proportion from the group consisting of 0.1–3% $Cr_2O_3$, 0.25–3% $HfO_2$, 2–5% $MoO_3$, 0.25–3% $Nb_2O_5$, 0.25–3% $Ta_2O_5$, 0.25–3% $WO_3$, and 1–10% $ZrO_2$, $Al_2O_3$ being present in the composition in an amount which is at least 5 mole percent and up to 50 mole percent in excess of that present in stoichiometric triclinic anorthite.

Aluminosilicate glasses useful as matrix materials in the fiber-reinforced composites of the invention may be characterized as alkali-free alkaline earth aluminosilicate glasses, being substantially free of alkali metal oxides such as $Na_2O$, $Li_2O$, and $K_2O$, and including one or more alkaline earth metal oxides selected from the group consisting of CaO, MgO, SrO and BaO. Such glasses will preferably consist essentially, in weight percent on the oxide basis, of about 50–66% $SiO_2$, 11–19% $Al_2O_3$, 20–30% total of RO, wherein RO consists of one or more oxides selected from the group consisting of CaO, MgO, SrO and BaO, 0–8% $B_2O_3$, and 0–2% of $As_2O_3$.

The application of oxide coatings to the selected silicon carbide reinforcing fibers to be combined with the above matrix materials may be accomplished by any suitable technique. Examples of suitable techniques include physical or chemical vapor deposition, or precipitation or coating from solutions or suspensions of the desired oxides.

A particularly convenient technique is a solution coating process. That method comprises first passing the fibers through a furnace, to remove sizing components therefrom, and then transporting the fibers for coating through an ultrasonic bath containing a solution or suspension of the oxide or of a desired compound which can be converted to the oxide by an appropriate post-treatment. Thus solutions of organometallic compounds of the selected metal, rather than suspensions of the oxides directly, may be used.

The coated fibers thus provided are then passed through a drying or reaction chamber where compounds other than oxides are converted to the oxide form, and/or oxide layers are dried by the removal of excess solvents such as water. The final temperature employed will be one sufficient to pyrolyze any remaining organic solution constituents present on the fibers.

Compounds suitable for preparing solutions for coating silicon carbide fibers include organometallic compounds such as the alkoxides of the desired metals. For conversion to the oxides, these may conveniently be steam-hydrolyzed in a reaction chamber following the fiber coating step to yield either the desired oxides directly or hydrated precursors thereof.

Typically, the thickness of the final oxide coating coating provided by any of these methods is inversely related to the rate of traverse of the fibers through the solution or suspension employed. Generally coatings with thicknesses in the range of 0.05–5 microns will be suitable for achieving improvements in embrittlement behavior in accordance with the invention.

As above noted, oxide-coated fibers produced as above described are most conveniently incorporated into glass and glass-ceramic matrix materials if the matrix materials are provided in particulate or powdered form. Such particulate matrix materials may readily be produced from glasses by converting the molten glass to a glass frit and then ballmilling or otherwise milling the glass frit to form a fine glass powder. Glass powders produced in this manner can readily be applied to fibers by coating the fibers with liquid suspensions of the powders. Typically, the powders will be suspended in a suitable coating vehicle comprising dispersants and binder constituents, and then the suspensions thus provided will be applied to the fiber tows or mats by immersing them into the matrix suspension.

The invention may be further understood by reference to the following examples, which are intended merely to illustrate the invention in terms of specific embodiments thereof.

EXAMPLE 1

A silicon carbide fiber tow is selected for oxide coating in accordance with the invention. The selected fiber tow is commercially available as Nicalon ® NLM 202 fiber tow, and consists of approximately 500 SiC filaments of substantially cylindrical cross-section per tow, the filaments having diameters of about 10–15 microns. These fiber tows include a polyvinyl acetate sizing material which is removed from the surfaces of the fibers by exposure to a gas-oxygen flame prior to the oxide coating step.

The fiber tows thus provided are coated with $ZrO_2$ by a solution coating technique. The fibers are first passed through a gas-oxygen flame to remove sizing therefrom and are then drawn through a solution of an organometallic zirconium compound to coat the fibers therewith. The solution employed consists of 50 parts by weight of a toluene solvent and 50 parts by weight of tetra-n-propyl zirconate, and is contained in the reservoir of a vibratory ultrasonic cleaner to promote thorough penetration thereof into the fiber tow being coated.

The fiber tow is pulled through the solution at a rate of about 3 feet per minute, and the coated fibers thus provided are then passed into a chamber containing a source of steam which rapidly hydrolyzes the organometallic compound and provides a zirconium oxide product therefrom. The thus-treated fiber is then passed through a drying furnace containing argon at a temperature of 800° C., this step being effective to remove all vaporizable constituents from the coating, leaving only the pure zirconium oxide on the surface of the coated fiber.

A ceramic matrix material is next selected for incorporation in the composite, this material consisting of a powdered calcium aluminosilicate glass having an oxide composition, in weight percent, of about 40.8% $SiO_2$, 39.7% $Al_2O_3$, 19.0% CaO, and 0.5% $As_2O_3$. This glass is melted and converted to glass frit by drigaging, and the frit is then ballmilled using alumina grinding media to achieve an average particle size of about 10–15 microns for the milled glass.

A suitable suspension of the powdered glass useful for coating the silicon carbide fiber tows with the matrix powder is next prepared by combining 315 parts by weight of the glass with a liquid vehicle consisting of about 700 parts by weight of isopropyl alcohol, 70 parts water, 52.2 parts polyvinyl acetate, 7 parts of a dispersant, and 7 parts of diethylene glycol. The dispersant used is commercially available as Katapol ™ VP532 dispersant from the GAF Corporation, Wayne, N.J.

The powdered glass incorporated in this vehicle has a composition such that it can be converted to a highly crystalline anorthite glass-ceramic matrix material upon appropriate heat treatment. This heating will normally be supplied later in manufacture, typically in the course of or following consolidation of the fiber-reinforced composite.

A fiber reinforced composite preform is prepared from the silicon carbide fiber tows by drawing the tows through the suspension of powdered matrix and winding the thus impregnated tows onto a drum to form a cylindrical fiber layup. After drying, the winding is cut from the drum and preform sheets are cut from the flattened winding for subsequent processing. Suitably, the cut sheet samples are preliminarily heated to evaporate residual solvent materials therefrom and then processed through a burnout step to remove organic binders. Burnout comprises heating the samples in air to a temperature of about 650 °C.

Consolidation of the thus treated samples is then carried out. Satisfactory consolidation is accomplished by hot pressing the samples to a temperature of 1340° C. at a pressure of 1500 psi. This treatment converts the glass powder matrix to a dense, non-porous crystalline glass-ceramic matrix wherein the principal crystal phase is anorthite.

Fiber-reinforced composite samples produced in accordance with the above-described procedure are evaluated for resistance to embrittlement by a hot strength testing procedure wherein they are tested for microcrack yield strength and ultimate flexural strength. These tests are carried out first at ambient temperatures and then at an elevated test temperature of 1000° C.

Table I below reports the results of these strength and microcrack tests for two samples produced in accordance with the above-described procedure. Included in Table I for each of the two samples at the two test temperatures are measured values for microcrack yield stress (MCY) in thousands of pounds per square inch (ksi), ultimate flexural strength as determined transverse to the direction of the fiber reinforcement in the material, in ksi, and an indication of the primary fracture mode observed for each sample, reported as fiber pull-out fracture (F), woody fracture (W), or brittle fracture (B). Also reported where observed are indications of fracture type, whether tensile (T) as typical of glassy brittle materials, or shear (S) as more typical of tough laminated composite ceramics. Where mixed modes and/or fracture types are observed, such are indicated in the Table.

TABLE I

ZrO₂-Coated Fiber Composites

| Sample Identification | Test Temp. °C. | MCY (ksi) | Ultimate Flexural Strength (ksi) | Primary Fracture Mode |
|---|---|---|---|---|
| Sample 1 | 25 | 47.4 | 68.1 | F; T+S |
|  | 1000 | 43.7 | 49.7 | W+B; T |
| Sample 2 | 25 | 42.7 | 71.3 | F; T+S |
|  | 1000 | 43.2 | 46.2 | W; T |

A study of the data reported in Table I indicates that the composites of the Example exhibit good retention of toughness at 1000° C., as evidenced by high microcrack yield strengths at that temperature. And while significant reductions in ultimate flexural strength are noted, the levels of strength retained are clearly superior to those of composites of similar composition but comprising SiC fibers not incorporating ZrO₂ coatings. Thus control samples of these materials omitting the coating typically exhibit ultimate flexural strengths of 30 ksi when tested at 1000° C. as above described.

EXAMPLE 2

The fiber coating procedure of Example 1 is repeated, except that for a fiber coating solution there is utilized, in place of the organometallic zirconium solution of Example 1, a zirconium oxide sol. The zirconium oxide sol consists essentially of 5 wt. % colloidal ZrO₂ suspended in an aqueous medium and is prepared from a dialyzed zirconyl acetate solution. To make the sol, a 10 wt. % aqueous zirconyl acetate solution is first dialyzed for 48 hours to produce a clear aqueous zirconia gel. This clear gel is then diluted with water to provide the 5 wt. % zirconia sol.

The fibers are coated utilizing this sol by transporting the fiber tow through the sol in the manner described in Example 1. To achieve variations in the thickness of the oxide coating, the tows are transported through the sol at varying rates, and in some cases are double-coated. The coated fiber tows are thereafter dried and fired to a temperature of 700° or 900° C. to remove organic and other materials from the ZrO₂ coatings.

FIG. 1 of the drawing is an electron photomicrograph of a group of SiC fibers provided with smooth ZrO₂ coatings in accordance with the described procedure. The fibers shown were pulled through the coating solution at a rate of 3 ft/min and thereafter fired at 700 °C. The micrograph was taken at a magnification of 1000× with the white bar indicating a dimension of 10 microns.

The fibers coated as described are next incorporated into fiber-reinforced composite products. For this purpose, a powdered matrix material suspended as in Example 1 is used to combine the fibers with the matrix, and the drying and thermal consolidation procedures of Example 1 are used to consolidate the preforms thus provided into dense fiber-reinforced composite samples.

The samples thus prepared are finally subjected to mechanical testing as described in Example 1. Table II below reports results for this mechanical testing for a number of composite samples provided with zirconia coatings of varying thicknesses at each of the two firing temperatures in accordance with the procedure described.

Included in Table II for each of the samples tested are data relating to the coating procedure used (coating rate and firing temperature), the temperatures at which the microcrack yield and ultimate flexural tests are conducted, and the measured values of microcrack yield strength and ultimate flexural strength, in ksi. Also included are descriptions of the primary fracture modes, whether fiber pull-out fracture (F), woody fracture (W), or brittle fracture (B) as well as indications of fracture type, whether tensile (T) or shear (S), as described above in conjunction with Table I.

TABLE II

ZrO₂-Coated Fiber Composites

| Sample No. | Coating Process | Test Temp. (°C.) | MCY (ksi) | Ultimate Flexural Strength (ksi) | Primary Fracture Mode |
|---|---|---|---|---|---|
| 3 | 1 ft/min | 25 | 47.5 | 6.6 | F; S+T |
|   | 700° C. | 1000 | 45.0 | 49.1 | W; T |
| 4 | 3 ft/min | 25 | 38.6 | 90.2 | F; S+T |
|   | 700° C. | 1000 | 40.0 | 46.2 | W; T |
| 5 | 3 ft/min | 25 | 40.1 | 83.2 | F; T |
|   | 700° C. | 1000 | 36.4 | 50.9 | F+W; T |
|   | (2 coats) | | | | |
| 6 | 3 ft/min | 25 | 42.6 | 43.4 | F; T |
|   | 900° C. | 1000 | 47.7 | 47.7 | W+B; T |
| 7 | 5 ft/min | 25 | 47.0 | 51.1 | B; T |
|   | 900° C. | 1000 | 43.2 | 49.1 | B; T |
| 8 | 10 ft/min | 25 | 58.8 | 61.9 | F; T |
|   | 900° C. | 1000 | 43.7 | 49.2 | W; T |

As is evident from a study of the data reported in Table II above, while significant reductions in ultimate tensile strength are observed in the samples provided with zirconia coatings in accordance with the procedures described, the levels of ultimate strength retained substantially exceed those for control samples processed in a similar way but omitting the $ZrO_2$ fiber coating. Also, in most cases, woody rather than brittle fracture modes are observed. This indicates that a substantial degree of protection from high temperature embrittlement has been achieved.

EXAMPLE 3

The procedure of Example 1 is repeated, except that in place of the $ZrO_2$ sol utilized to coat the silicon carbide fiber tows, a sol comprising $CeO_2$ is used for this purpose. The sol employed is a commercial cerium oxide sol, sold as 19.8% (wt) ceria acetate by Nyacol Products, Inc., Ashland, Mass. As in Examples 1 and 2, the fiber tows are coated with this sol by drawing the tows through a quantity of the sol in a container. For some samples, ultrasonic vibration of the container is used to promote penetration into the tows, while for other tows no ultrasonic vibration is used.

Figure 2:
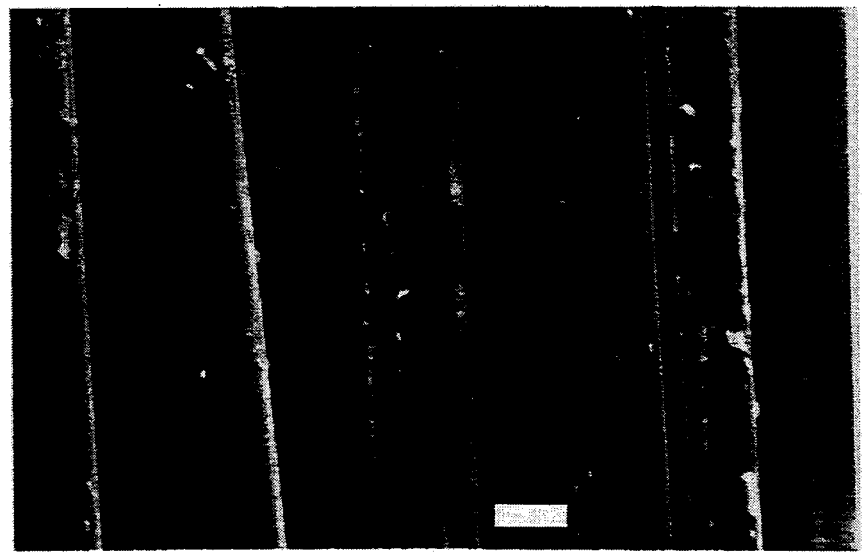
FIG. 2 is an electron photomicrograph of a fiber provided with a $CeO_2$ coating for use in accordance with the invention.

Following coating, the fiber tows are dried and heated to a temperature of 800° C. to remove organic materials and other volatile by-products from the coatings. FIG. 2 of the drawing is an electron photomicrograph of a group of SiC fibers provided with $CeO_2$ coatings in accordance with the described procedure. The fibers shown were pulled through the $CeO_2$ coating solution at a rate of 5 ft/min and were thereafter fired at 800° C. as described. The micrograph of FIG. 2 was taken at a magnification of 1000× with the white bar indicating a dimension of 10 microns.

The $CeO_2$ coated fibers thus provided are incorporated into ceramic matrix composites employing the powdered matrix suspension and fabrication procedures described in Example 1. Following heat consolidation of the composites, samples thereof are subjected to mechanical testing as therein described.

The results of mechanical testing of the described samples are reported in Table III below. Included in Table III for each of the samples are an indication of the coating process used, an indication of the test temperature of each test, the microcrack yield stress for the samples, the ultimate flexural strength of each sample as determined in a direction transverse to the axis of fiber reinforcement in the material, and an indication of the mode of fracture in each case, whether fiber pull-out fracture (F), woody fracture (W), or brittle fracture (B). In all of the cases reported, the observed fractures are tensile rather than shear type fractures.

TABLE III

CeO₂-Coated Fiber Composites

| Sample No. | Coating Process | Test Temp. °(C.) | MCY (Ksi) | Ultimate Flexural Strength (Ksi) | Primary Fracture Mode |
|---|---|---|---|---|---|
| 9 | 3 ft/min | 25 | 49.0 | 50.2 | F+B |
|   | 800° C. | 1000 | 29.9 | 44.9 | W |
| 10 | 5 ft/min | 25 | 44.4 | 48.5 | F+W |
|    | 800° C. | 1000 | 44.5 | 47.7 | W+B |
| 11 | 5 ft/min | 25 | 36.1 | 54.1 | F |
|    | 800° C. | 1000 | 41.5 | 56.0 | B+W |

(no ultrasound)

A study of the data reported in Table III indicates that, while the room temperature flexural strengths of composite products provided with $CeO_2$-coated fibers are relatively modest, the novel composites exhibit almost no deterioration in ultimate flexural strength when heated from ambient to a test temperature of 1000° C. Thus these materials exhibit excellent resistance to embrittlement, and would be particularly well suited for use in applications wherein high temperature strength is more important than high strength at ambient temperatures.

The benefits of oxide coating for SiC fiber composites provided in accordance with the invention appear presently to be confined to $ZrO_2$ and $CeO_2$ alone. Hence fibers coated with selected other oxides utilizing similar processing, when incorporated into fiber-reinforced composites using the same matrix glass-ceramic and the same fabrication procedures as described in the foregoing Examples, have not been found to show significant enhancements in high-temperature strength retention.

Table IV below reports the results of mechanical testing for fiber reinforced composites provided with two oxide coatings other than the coatings of the invention. Reported in Table IV are strength and toughness test data for composites comprising fibers coated with $Y_2O_3$ and fibers coated with $SnO_2$. Included in the Table are an indication of the test temperature of each test, the microcrack yield stress for the samples, the ultimate flexural strength of each sample as determined in a direction transverse to the axis of fiber reinforcement in the material, and an indication of the mode of fracture in each case, whether fiber pull-out fracture (F), woody fracture (W), or brittle fracture (B). In all of the cases reported, the observed fractures are again tensile rather than shear type fractures.

TABLE IV

Other Oxide Coatings

| Sample No. | Coating Oxide | Test Temp. (° C.) | MCY (ksi) | Ultimate Flexural Strength (ksi) | Primary Fracture Mode |
|---|---|---|---|---|---|
| 12 | $Y_2O_3$ | 25 | 45.4 | 52.3 | F+W |
|    |          | 1000 | 33.7 | 35.6 | W+B (delaminated) |
| 13 | $SnO_2$ | 25 | 30.2 | 55.9 | F+S |
|    |         | 1000 | 30.9 | 33.3 | W+B |

As is evident from a study of the data in Table IV, the two oxides shown do not effectively enhance high temperature performance in SiC fiber reinforced composites of the type herein described. Thus the $Y_2O_3$-coated fibers produced a composite showing a 32% reduction in flexural strength at 1000° C., while the SnO2-coated fibers produced a composite showing a 40% strength reduction at that temperature. This is in marked contrast to the performance of the composites of the invention.

While the invention has been particularly described above with respect to specific materials and specific procedures, it will be recognized that those materials and procedures are presented for purposes of illustration only and are not intended to be limiting. Thus numerous modifications and variations upon the compositions and processes specifically described herein may be resorted to by those skilled in the art within the scope of the appended claims.

We claim:

1. A fiber-reinforced ceramic matrix composite comprising reinforcing silicon carbide fibers disposed in a substantially non-porous ceramic matrix selected from the group consisting of alkaline earth aluminosilicate glasses and alkaline earth aluminosilicate glass-ceramics, wherein the silicon carbide fibers are provided with an oxide surface coating consisting essentially of at least one oxide selected from the group of $ZrO_2$ and $CeO_2$.

2. A fiber-reinforced ceramic matrix composite in accordance with claim 1 wherein the non-porous ceramic matrix is an alkaline earth aluminosilicate glass-ceramic wherein the predominant crystal phase is selected from the group consisting of anorthite and its pseudo-binaries with mullite ($3Al_2O_3 \cdot SiO_2$), cordierite ($2MgO \cdot 2Al_2O_3 \cdot 5SiO_2$), barium osumilite ($BaO \cdot 2MgO \cdot 3Al_2O_3 \cdot 9SiO_2$), albite solid solution ($Na_2O \cdot Al_2O_3 \cdot 6SiO_2$), $Al_2O_3$, $SiO_2$, $CaO \cdot SiO_2$, and gehlenite ($2CaO \cdot Al_2O_3 \cdot SiO_2$).

3. A fiber-reinforced ceramic matrix composite in accordance with claim 2 wherein the alkaline earth aluminosilicate glass-ceramic has a composition consisting essentially, in weight percent on the oxide basis, of about:

| | | | |
|---|---|---|---|
| CaO | 0–25 | MgO | 0–15 |
| SrO | 0–30 | Na2O | 0–4 |
| CaO+SrO | 10–30 | K2O | 0–6 |
| Al2O3 | 25–38 | TiO2 | 0–12 |
| SiO2 | 35–60 | ZrO2 | 0–15 |
| BaO | 0–25 | As2O3 | 0–3 | and wherein the total of $BaO+MgO+Na_2O+K_2O+TiO_2+ZrO_2+As_2O_3$ is in the range of 0–30% by weight.

4. A fiber-reinforced ceramic matrix composite in accordance with claim 1 wherein the non-porous ceramic matrix is an alkaline earth aluminosilicate glass-ceramic wherein the predominant crystal phase consists essentially of triclinic anorthite and at least one of mullite and alpha alumina.

5. A fiber-reinforced ceramic matrix composite in accordance with claim 4 wherein the alkaline earth aluminosilicate glass-ceramic consists essentially, in weight percent, of about 16–20% CaO, 38.5–46% $Al_2O_3$, 35–42% $SiO_2$, 0.25–1.5% $As_2O_3$, and up to 10% total of at least one nucleating agent selected in the indicated proportion from the group consisting of 0.1–3% $Cr_2O_3$, 0.25–3% $HfO_2$, 2–5% $MoO_3$, 0.25–3% $Nb_2O_5$, 0.25–3% $Ta_2O_5$, 0.25–3% $WO_3$, and 1–10% $ZrO_2$, wherein $Al_2O_3$ is present in an amount which is at least 5 mole percent and up to 50 mole percent in excess of that present in stoichiometric triclinic anorthite.

6. A fiber-reinforced ceramic matrix composite in accordance with claim 1 wherein the matrix is an alkaline earth aluminosilicate glass substantially free of the alkali metal oxides $Na_2O$, $Li_2O$, and $K_2O$ and comprising at least one alkaline earth metal oxide selected from the group consisting of CaO, MgO, SrO and BaO.

7. A fiber-reinforced ceramic matrix composite in accordance with claim 6 wherein the alkaline earth aluminosilicate glass consists essentially, in weight percent on the oxide basis, of about 50–66% $SiO_2$, 11–19% $Al_2O_3$, 20–30% total of RO, wherein RO consists of one or more oxides selected from the group consisting of CaO, MgO, SrO and BaO, 0–8% $B_2O_3$, and 0–2% of $As_2O_3$.

8. A method for making a fiber-reinforced ceramic matrix composite article comprising the steps of embedding inorganic reinforcing silicon carbide fibers in an aluminosilicate ceramic matrix material and thereafter consolidating the fibers and ceramic matrix material with heat and pressure to provide a substantially non-porous ceramic material having the fibers embedded therein, wherein prior to the step of embedding the fibers in the matrix material the fibers are provided with an oxide coating consisting essentially of at least one oxide selected from the group consisting of $ZrO_2$ and $CeO_2$.

9. A method in accordance with claim 8 wherein the ceramic matrix material is provided as particulate aluminosilicate ceramic material.

10. A method in accordance with claim 9 wherein the oxide coating is applied by vapor deposition.

11. A method in accordance with claim 9 wherein the oxide coating is applied by immersing the fiber in an oxide solution or suspension.

12. A method in accordance with claim 9 wherein the oxide coating is applied by the steps of immersing the fiber in a solution of an organometallic compound of $CeO_2$ or $ZrO_2$ and thereafter converting the organometallic compound on the fiber surface by thermal oxidation to $CeO_2$ or $ZrO_2$.

13. A method in accordance with claim 9 wherein the oxide coating has a thickness in the range of about 0.05–5 microns.

* * * * *